Patented June 22, 1948

2,443,742

UNITED STATES PATENT OFFICE 2,443,742

MANUFACTURE OF SULFONAMIDE COMPOUNDS

Walter Lorenz, Robert Behnisch, and Fritz Mietzsch, Wuppertal-Elberfeld, Germany, assignors, by mesne assignments, to Winthrop-Stearns Inc., New York, N. Y., a corporation of Delaware No Drawing. Application July 15, 1941, Serial No. 402,560. In Germany July 20, 1940

12 Claims. (Cl. 260—239.6)

This invention relates to the manufacture of sulfonamide compounds and to certain intermediate products of such manufacture.

In accordance with the present invention sulfonamide compounds of the benzene series are obtainable by reacting upon cyclic amino compounds such as aminobenzene, aminopyridine, aminoquinoline, aminoisoquinoline and aminothiazol compounds with 4-nitro-benzenesulfenylchloride in the presence of a solvent which is inert to the initial materials. In this reaction 4-nitrobenzene-sulfenamide compounds are formed, the amide group of which is substituted by the cyclic radical of the cyclic amino compound. In accordance with the present invention these 4-nitrobenzene-sulfenamide compounds are converted into 4-nitrobenzene-sulfonamide compounds, the amide group of which is substituted by the cyclic radical by the action of an oxidizing agent at a moderate temperature and in the presence of a diluent which is inert to the reacting components. The various oxidizing agents which are customary for such purposes, for instance hydrogen peroxide, alkali metal bichromate, alkali metal permanganates and nitric acid, have proved operable in the process of the present invention. The cyclic amino compounds used as initial materials may contain ring-substituents, for instance alkyl, halogen and other groups, as for instance toluidines and xylidines, 3.5-dihalogenated anilines, aminobenzene-sulfonamides, -sulfon-mono- and -dimethylamides, 5-halogen-2 - aminopyridine, 4 - methyl - 2 - aminothiazol, aminobenzthiazol and similar compounds. The oxidation advantageously is started while cooling the reaction mixture and is completed at room temperature or at moderately increased temperature. Higher temperatures cause the formation of undesired by-products since in this case the decomposition of the sulfenamide compounds which are readily decomposed by aqueous media and particularly by dilute acids takes place more rapidly than the oxidation. The oxidizing agent and the oxidation temperature depend on the substituents which are present in the sulfenamide compound. Compounds which contain readily oxidizable substituents are oxidized at a rather low temperature and advantageously with hydrogen peroxide, other more stable compounds may be oxidized with nitric acid or with permanganate. The preferred diluent for the oxidation reaction is acetic acid, but other diluents which are inert to the reacting components such as acetone and pyridine, also may be used. The sulfonamide compounds thus formed generally are obtained directly in crystals; they may be separated and purified from all other products by means of strong alkalis in view of their weakly acid character.

It is most surprising that in accordance with the process described above sulfonamide compounds of the benzene series with a cyclic substituent in the amide group are obtainable in a very convenient manner, for it is known that upon reaction of oxidizing agents on N-arylsulfenyl - anilines, arylsulfenimino - quinones or amorphous products which have been considered as mixtures and the constitution of which could not be established with certainty have been obtained.

The invention is illustrated by the following examples but not restricted thereto:

Example 1

5 grams of 2'-(4-nitrobenzene-sulfenamido)-pyridine are suspended in 70 ccs. of acetic acid and, while cooling, 14 grams of hydrogen-peroxide (20 per cent) are added to the mixture. The mixture is stirred for 12 hours at room temperature. During this time a clear silution gradually results and thereupon a new compound begins to precipitate in glistening leaflets. After filtering with suction and washing with ether the chemically pure 2'-(4-nitrobenzene-sulfonamido)-pyridine is obtained in colorless crystals. The compound dissolved in normal sodium hydroxide solution with a yellow color and reprecipitates when acetic acid is added in form of colorless leaflets melting at 164 to 165° C.

The 2'-(4-nitrobenzene-sulfenamido)-pyridine being the necessary starting material, is obtained by reacting 4-nitro-benzenesulfenylchloride with α-aminopyridine in anhydrous ether. From acetone it crystallizes in yellow crystals melting at 164° C.

Example 2

6 grams of 2'-(4-nitrobenzene-sulfenamido)-pyridine are suspended in 100 ccs. of acetic acid and, while cooling and stirring, a solution of 10 grams of sodium bichromate in 25 ccs. of water is added to the mixture. At first the temperature of the mixture is kept at 15° C., later on for 12 hours without cooling at 20 to 25° C. After diluting with 100 ccs. of water the precipitate is filtered with suction and washed with water. It is dissolved in normal sodium hydroxide solution and the solution is filtered off from a small part of undissolved substance. The filtrate is acidified with acetic acid, whereupon the 2'-(4-nitrobenzene-sulfonamido)-pyridine precipitates in colorless crystals melting at 164° C. When the oxidation is performed at a higher temperature, the quantity of the by-product being unsoluble in the sodium hydroxide solution increases.

Example 3

5 grams of 2'-(4-nitrobenzene-sulfenamido)-pyridine are suspended in 100 ccs. of acetic acid and 10 ccs. of nitric acid are added drop by drop to the mixture. Nitrous gases develop and the temperature raises to 50° C. After standing for 12 hours the mixture is diluted with 200 ccs. of water. Then crystallization slowly takes place. After 30 minutes the crystals are filtered with suction, washed with water and purified as stated in Example 2. The 2'-(4-nitrobenzene-sulfonamido)-pyridine melting at 164° C. is obtained.

Example 4

A solution of 8 grams of N-(4-nitrobenzene-sulfenyl)-4'-toluidine in 100 ccs. of acetic acid are slowly added to 30 grams of 20 per cent hydrogen-peroxide solution while stirring and cooling. The solution being at first yellow gradually changes to wine-red and crystals slowly precipitate. After standing for 18 hours the solution is carefully diluted with 50 ccs. of water and the precipitate is filtered with suction. The raw product is dissolved in warm normal sodium hydroxide solution, the solution is filtered off from a small quantity of an undissolved brown substance and the filtrate is acidified. The resulting precipitate is filtered with suction and dissolved and reprecipitated from alcohol. The N-(4-nitrobenzene-sulfonyl)-4'-toluidine is obtained in yellow crystals melting at 180 to 181° C. When diluting with water further quantities of the product may be obtained from the mother liquor.

Example 5

A solution of 8 grams of N-(4-nitrobenzene-sulfenyl)-4'-toluidine in 80 ccs. of acetic acid is gradually treated with a solution of 6 grams of potassium permanganate in 30 ccs. of water. The oxidation solution has to be cooled well as the conversion otherwise takes place very rapidly. After stirring for some time at room temperature the solution is diluted with water and the precipitate is filtered with suction. It is purified by dissolving in sodium hydroxide solution, reprecipitating with hydrochloric acid and dissolving and precipitating twice from alcohol. The N-(4-nitrobenzenesulfonyl)-4'-toluidine is obtained in light yellow needles melting at 180 to 181° C.

Using methods analogous to those of the examples, other sulfenamides may also be oxidized to sulfonamide. For instance, 2'-(4-nitrobenzene-sulfenamido)-thiazole (which crystallizes from acetone as solid crystals melting at 166° C.) thus yields 2'-(4-nitrobenzene sulfonamido)-thiazole as yellow crystals, melting point 260° C. (from acetic acid). Likewise, 2'-(4-nitrobenzenesulfenamido)-4'-methylthiazole, which crystallizes from dioxane as yellow crystals of melting point 183° C., on oxidation gives 2'-(4-nitrobenzene-sulfonamido)-4'-methylthiazole as yellow crystals, melting point 194° C. (from acetic acid).

We claim:

1. The benzene sulphenamides of the formula:

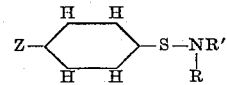

in which Z is a group having a nitrogen atom directly bound to the benzene radical, R is a radical of the group consisting of H and a substituent and R' is a nitrogen containing heterocyclic radical, the N being directly bonded to a carbon atom of the hetero R' ring.

2. A sulfenamide of the formula

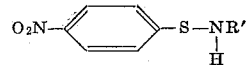

where R' is a nitrogen-containing heterocyclic radical, the N being directly bonded to a carbon atom of the hetero R' ring.

3. The products of claim 1 in which Z is the radical —NO$_2$.

4. The compound 2-(p-nitrobenzene sulphenamido)-thiazole.

5. The compound 2-(p-nitrobenzene sulphenamido)-pyridine.

6. The compound 2-(p-nitrobenzenesulfenamido)-4-methylthiazole.

7. A process of preparing sulfonamides which comprises oxidizing to

the —S—N< linkage of a benzene sulfenamide of the formula:

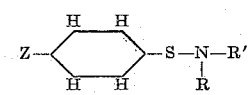

in which Z is a group having a nitrogen atom directly bound to the benzene radical, R is a radical of the group consisting of H and a substituent, and R' is a heterocyclic radical having a nitrogen atom in the ring, and in which the N of the formula is directly bonded to a carbon atom of the hetero R' ring.

8. The process of claim 7 in which

is a radical of the class consisting of amino thiazoles and Z is —NO$_2$.

9. The process of claim 7 in which

is a radical of the class consisting of amino pyridines and Z is —NO$_2$.

10. The process comprising oxidizing para-nitro benzene sulfenamido-2 pyridine to para-nitro benzene sulfonamide-2 pyridine.

11. The process comprising oxidizing para-nitro benzene sulfenamido-2 thiazole to para-nitro benzene sulfonamido-2 thiazole.

12. The process comprising oxidizing 2-(para-nitrobenzenesulfenamido) - 4 - methylthiazole to 2-(para-nitrobenzenesulfonamido)-4-methylthiazole.

WALTER LORENZ.
ROBERT BEHNISCH.
FRITZ MIETZSCH.

(References on following page)

REFERENCES CITED

The following references are of record in the file of this patent:

UNITED STATES PATENTS

| Number | Name | Date |
|---|---|---|
| Re. 19,286 | Zaucker et al. | Aug. 21, 1934 |
| 2,045,888 | Tschunkur et al. | June 30, 1936 |
| 2,216,515 | Johnson | Oct. 1, 1940 |
| 2,259,222 | Ewins et al. | Oct. 14, 1941 |

FOREIGN PATENTS

| Number | Country | Date |
|---|---|---|
| 517,272 | Great Britain | Jan. 25, 1940 |

OTHER REFERENCES

Chem. Abstracts, vol 33, page 8587 [citing: Journal Amer. Chem. Soc., vol. 61, pages 2340-2341; (1939)]; ibid., vol. 24, pages 365-6 [citing: Monatschefte, vols. 53 and 54, pages 111-118 (1929)]; ibid., vol. 13, page 575 [citing: J. Chem. Soc. (London), vol. 114, I, pages 537-9].

Zincke et al.: Annalen, vol. 400, page 13 (1913).

Chem. Abstracts, vol. 19, page 1855; ibid., vol. 24, page 601 [citing: Monatschefte, vol. 52, pages 365-7]; ibid., vol. 25, page 289; ibid., vol. 26, pages 114 and 115.